US007327385B2

(12) United States Patent
Yamaguchi

(10) Patent No.: US 7,327,385 B2
(45) Date of Patent: Feb. 5, 2008

(54) HOME PICTURE/VIDEO DISPLAY SYSTEM WITH ULTRA WIDE-BAND TECHNOLOGY

(75) Inventor: Hirohisa Yamaguchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 847 days.

(21) Appl. No.: 10/717,776

(22) Filed: Nov. 20, 2003

(65) Prior Publication Data

US 2005/0120381 A1    Jun. 2, 2005

(51) Int. Cl.
*H04N 5/225* (2006.01)
(52) U.S. Cl. ............... 348/207.1; 348/207.11
(58) Field of Classification Search ........... 725/105, 725/133, 141, 153; 455/426.2; 348/207.1, 348/207.11, 552
See application file for complete search history.

(56) References Cited

U.S. PATENT DOCUMENTS

| 6,535,239 | B1 * | 3/2003 | Kim ................. 348/14.02 |
| 2002/0093575 | A1 * | 7/2002 | Kusaka .................. 348/233 |
| 2003/0016844 | A1 | 1/2003 | Numaoka |
| 2003/0140296 | A1 * | 7/2003 | Odman .................. 714/749 |
| 2003/0164794 | A1 | 9/2003 | Haynes et al. |
| 2003/0171652 | A1 | 9/2003 | Vokoi et al. |
| 2003/0214967 | A1 * | 11/2003 | Heberling ............... 370/437 |

(Continued)

OTHER PUBLICATIONS

"A UWB Architecture for Wireless Video Networking", G. R. Aiello, L. Taylor and M. Ho, reprinted from the Internet at: www.staccatocommunications.com/papers/icce-final.pdf, 10 pgs.

(Continued)

*Primary Examiner*—Lin Ye
*Assistant Examiner*—Yogesh Aggarwal
(74) *Attorney, Agent, or Firm*—Steven A. Shaw; W. James Brady; Frederick J. Telecky, Jr.

(57) ABSTRACT

A new display system and method is described, utilizing a cellular telephone having digital camera capability and a television linked directly over a UWB wireless signal forming a UWB wireless video pico-net. The system utilizes a digital camera unit to capture picture or video images for UWB transmission directly to the television acting as a pico-net host controller, either independently or together with the cellular telephone operating as a pico-net child. The display system comprises and one or more remote devices and a host display communicating on a UWB wireless network. The host display comprises a display for presentation of the picture or video images and a UWB transceiver for processing image data from the picture or video images, for selectively sending and receiving the image data based on a request from the child. The one or more remote devices comprise a digital camera for capturing the picture or video images and another UWB transceiver as used in the host display. The host display has a generally larger display for improved presentation of the captured picture or video images useful and amusing for group, party, wedding, and conference viewing, or simply for enhanced personal enjoyment. For picture or video image sharing, the system further facilitates downloading the current picture or video images from the host display television to a requesting cellular telephone or digital camera equipped with the UWB transceiver. The UWB display system provides sufficient bandwidth to support numerous such download requests simultaneously, while utilizing a transmission technology having minimal power consumption.

25 Claims, 7 Drawing Sheets

U.S. PATENT DOCUMENTS

2004/0012810 A1* 1/2004 Haas et al. .................. 358/1.15
2004/0061773 A1* 4/2004 Liu .......................... 348/14.02
2004/0071249 A1* 4/2004 Schell ........................ 375/371

OTHER PUBLICATIONS

"Ultra Wideband to Capture Wireless Video Market", reprinted from the Internet at: http://www..3g.co.uk/PR/June2003/5436.htm, Jun. 2, 2003, 3 pgs.

"Systems & Software—Group hopes to leapfrog 802.11 for wireless video", Rick Merritt, EE Times, reprinted from the Internet at: http://www.eetimes.com/sys/news/OEG20030502S0060, May 3, 2003, 3 pgs.

"Wireless Video", AT&T Labs-Research Mobile Wireless Network Research, reprinted from the Internet at: http://www.research.att.com/areas/wireless/Mobile_Application/Wireless_Video/wireless_video.html, 3 pgs.

"2.4 gig Wireless Products and Accessories", CU1.com, reprinted from the Internet at: http://cul.com/24gig.html. 1 pg.

* cited by examiner

HOME PICTURE/VIDEO DISPLAY SYSTEM WITH ULTRA WIDE-BAND TECHNOLOGY

FIELD OF INVENTION

The present invention relates generally to wireless video networking devices and more particularly to display systems and methods for wirelessly transmitting and receiving picture and video between digital image capturing devices and a home display utilizing ultra wide-band communications.

BACKGROUND OF THE INVENTION

Recently, a large percentage of cellular phones are being sold with built-in digital still camera capability. This is especially evident in Japan where their number has reached 40 million, and the majority of cellular phones are currently sold with built-in digital still cameras. This trend is expected to further accelerate throughout the Asian market then quickly spread to the rest of the world wide market. Advanced cellular phones will also have higher resolution camera capabilities, for example, 2M pixels (2000×1000 pixels) or approximately the resolution of HDTV.

With so many cellular phones built with the digital still camera capability, it has become a common form of entertainment to show/share pictures with each other at homes, parties, and other general social events. At present, such picture display is generally limited to the local, small LCD screen on the cellular phone. Communicating such high resolution images with these advanced cellular phones will require greater bandwidth and image data throughput.

Accordingly, there is a need for an enhanced system of image display for cellular phones and other such wireless devices having digital camera capabilities, while ensuring adequate bandwidth and resolution for the advanced imaging capabilities anticipated, yet with minimal power consumption.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a display system and method using UWB wireless technology. In an exemplary aspect of the present invention, the display system and method may be implemented in a cellular telephone having digital camera capability, wirelessly linked over a UWB signal directly to a television for enhanced image display. The display system may be characterized as comprising one or more remote "pico-net" (or piconet) "child" devices and a "host" display communicating on a UWB wireless network (or video pico-net). Both the host display and the child device(s) of the display system comprise a UWB image transceiver to support the UWB protocol of the piconet.

In one aspect of the invention, the system utilizes a digital camera unit to capture picture or video images either independently or combined with the cellular telephone representing the piconet child of the display system. Using the UWB image transceiver, the picture or video images are transmitted to the television acting as the piconet host controller (or host display) for the display system. The host display (e.g., television, PC, or video projector) provides a large venue display of the captured picture or video images for improved presentation (relative to the small LCD display of a typical cellular phone), useful and amusing for groups, parties, weddings, and conference viewing, or simply for enhanced personal enjoyment. Although a television is often referenced herein as the display device, any other such large venue video or image display device is also contemplated in the context of the present invention, including a PC or a video projector, utilizing LCD, CRT, Plasma, flat panel, and DLP display technologies.

In another aspect of the present invention, the system further facilitates picture or video image sharing. The current picture or video images displayed on the host display (e.g., television, PC, or video projector) may be downloaded to a requesting cellular telephone or digital camera equipped with the UWB image transceiver. The UWB display system provides sufficient bandwidth to support numerous such download requests concurrently, while utilizing a transmission technology having minimal power consumption.

The present invention further contemplates a UWB consumer electronics chipset, operable to accommodate cellular phone, digital camera, television, PC, projector and other such devices. Some consumer electronics manufacturers making both cellular phones and display devices, or digital cameras and display devices may have particular end-product interest in the chipset.

In still another aspect of the invention, the UWB image transceiver used by the child and host comprises a memory, a picture processing unit, a UWB MAC unit, and a UWB PHY unit. The memory temporarily stores the image data captured by the digital camera unit, and for presentation as an image on the local or host display. The picture processing unit compresses the image data stored in the memory, and supports the graphics user interface (GUI) of the local and host display. The UWB MAC unit supports the UWB protocol for sensing the UWB host, synchronizing communications with the host, and establishing a communications link for uploading or downloading image data to/from the host, respectively. The UWB PHY unit comprises baseband and RF hardware coupled to the antenna, the UWB PHY unit being used to transmit and receive UWB signals of the image data over the UWB video piconet.

In yet another aspect of the present invention, a wireless device is presented for directly communicating picture or video images over a UWB wireless signal with a host display or another wireless device. The wireless device comprises a display for local presentation of the picture or video images, and a UWB image transceiver. The wireless device may be a cellular phone and/or a digital camera, or a host display. The wireless device may comprise, for example, a cellular phone or a digital camera equipped with the UWB image transceiver.

In another aspect of the invention, a wireless display device is presented for displaying picture or video images on a large venue host display, the image data received over a UWB wireless signal directly from a UWB wireless remote device. The remote device may be a cellular phone and/or a digital camera.

Thus, at present, UWB is considered to be the best suited solution for short-distance wireless connectivity for the near future of consumer electronics end products. Using the UWB protocol and display system of the present invention, cellular phones, digital cameras and other such wireless devices having digital camera capabilities are assured of adequate bandwidth and image data throughput for the advanced imaging anticipated, yet with minimal power consumption. In addition to these consumer products, the host display device of the display system may be further implemented in a television, PC, or video projector, ensuring both the consumer's and manufacturer's interest.

Still another aspect of the invention provides a method of communicating picture or video images over a UWB wireless signal directly between a cellular telephone and a host display of a display system. The method either uploads image data from the cellular phone to the host display, or downloads the image(s) on the display to a requesting cellular phone. In the upload, the method comprises transmitting an initial access request from the cellular telephone to the host display, requesting an upload of the picture or video images, waiting for readiness of the host display, and transmitting an acceptance for the upload. The method also includes uploading the picture or video images over the UWB wireless signal, storing the picture or video images in a host memory of the host display, accessing the host memory, and displaying the picture or video images on the host display.

For the download, the method may further comprise transmitting an image download request to the host display from a requesting cellular telephone, thus requesting a download of the picture or video images currently displayed on the host display, waiting for an acknowledgement from the host display for the download, and transmitting to the requesting cellular telephone, the acknowledgement for the download. The download method also includes downloading the picture or video images over the UWB wireless signal to the requesting cellular telephone, receiving and storing the picture or video images in a local memory of the requesting cellular telephone, accessing the local memory, and displaying the picture or video images on a local display of the requesting cellular telephone.

In another aspect of the present invention, the picture or video images may be further downloaded to multiple requesting cellular telephones simultaneously.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
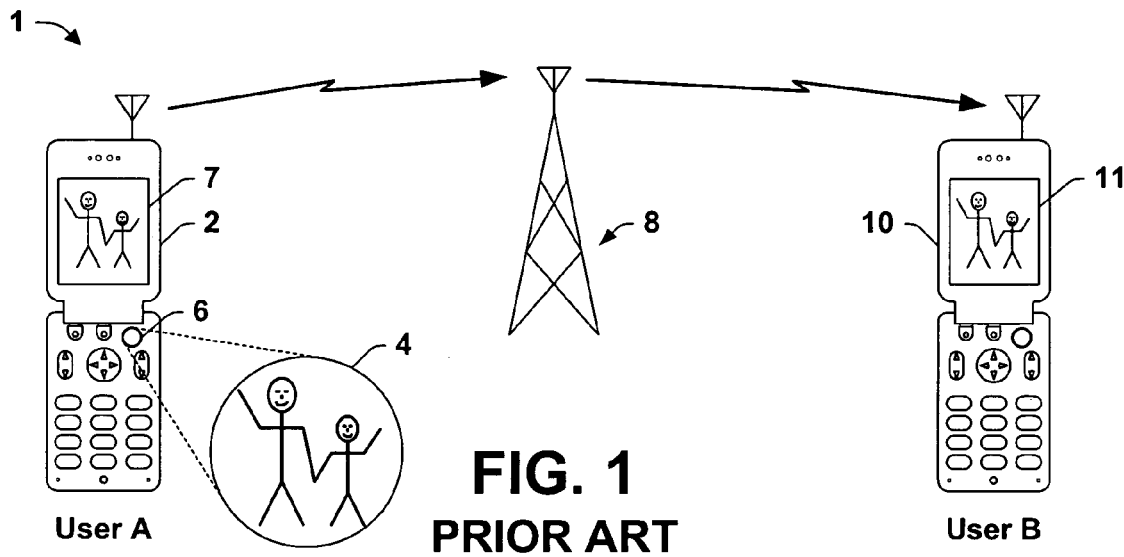
FIGS. 1, 2, and 3 are prior art diagrams illustrating the limited present means of exchange of picture or video image content between cellular phone users.

The present invention will now be described with reference to the attached drawings, wherein like reference numerals are used to refer to like elements throughout. The invention relates to a wireless image display system for the consumer electronics marketplace utilizing a new ultra wide band (UWB) chipset enabled end-product in which picture or video images may be directly exchanged between a cellular phone and a host display (e.g., television, PC, or video projector) in association with the UWB protocol.

The Institute of Electrical and Electronics Engineers (IEEE) has produced a series of standards referred to as 802.X, which encompasses LANs (Local Area Networks), MANs (Metropolitan Area Networks) and PANs (Personal Area Networks) such as Bluetooth. The IEEE 802 is confined to standardizing processes and procedures that take place in the bottom two layers of the OSI (Open System Interconnection) reference model—the media access control (MAC) sublayer of the link layer and the physical layer (PHY).

The original standard that is currently used to establish a wireless local area network (WLAN) is the IEEE 802.11 standard. The IEEE 802.11 standard was published first in 1997 and it was designed to provide data rates up to 2 Mbps (such as a DSL connection) at 2.4 Ghz. The standard includes specifications for Media Access Control (MAC) and physical layer (PHY) operation. The physical layer standard was designed to use either frequency hopping spread spectrum (FHSS) or direct sequence spread spectrum (DSSS). In 1999, 802.11a and 802.11b provided enhancements at the physical layer with higher data rate support up to 54 Mbps in the 5 GHz band and 11 Mbps in the 2.4 GHz band, respectively.

A revolutionary wireless technology is emerging in the consumer electronics marketplace, known as ultra wideband technology (UWB) also called impulse radio technology or impulse radio. UWB or impulse radio transmitters emit short pulses approaching a Gaussian monocycle with tightly controlled pulse-to-pulse intervals. Key features of the UWB technology are low cost and low power compared with existing IEEE 802.11 a/b devices, with a high data rate throughput over short distances as compared to Blue Tooth. For example, UWB at 5 meters has a data rate of 400 Mbps, and at 20 meters UWB has a data rate of 28 Mbps compared to only 720 Kbps for Blue Tooth.

UWB is defined in a newer 802.15.3a (UWB) standard along with the 802.15.3a MAC standard. Also defined in the prior 802.15.3 standard, and the more recent 802.15.3a MAC standard is the "pico-net" (or piconet) for UWB. The piconet represents a group of UWB devices working synchronously and communicating wirelessly with each other. Each piconet includes a parent device (piconet controller, or piconet host) and other piconet child devices. The piconet controller transmits synchronization codes (used to establish a time slot for data transmission) and defines the basic information frame length for the device access within the same piconet. Wireless networks fit both business and home environments, that both require the support of multimedia, and the 802.15.3a (UWB) standard provides the solution for this short-distance wireless connectivity need.

The cellular network is a form of wireless network referred to as a wide area network (WAN) topology, wherein each wireless network requires a radio transceiver and antenna. Components on the wireless network are either stations (STAs) or access points (APs). Typically, a station STA is mobile or portable, and the access point AP may be a permanent structure analogous to a base station tower used in cellular phone networks or to a hub used in a wired network. A basic service set (BSS) is formed when two or more stations have recognized each other and established a network. An extended service set (ESS) is formed when BSSs (each one comprising an AP) are connected together.

Figure 2:
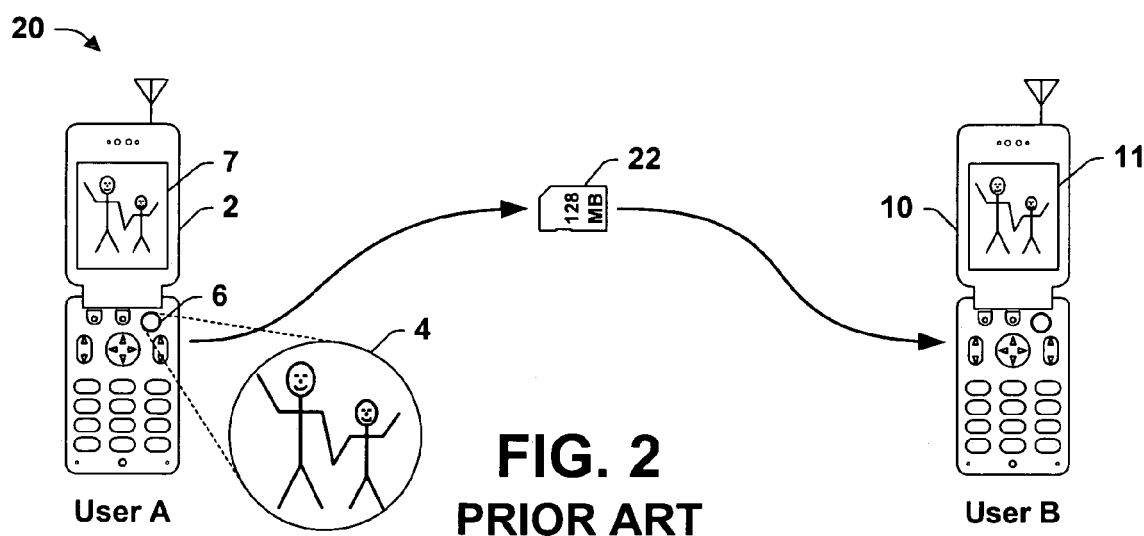
Figure 3:
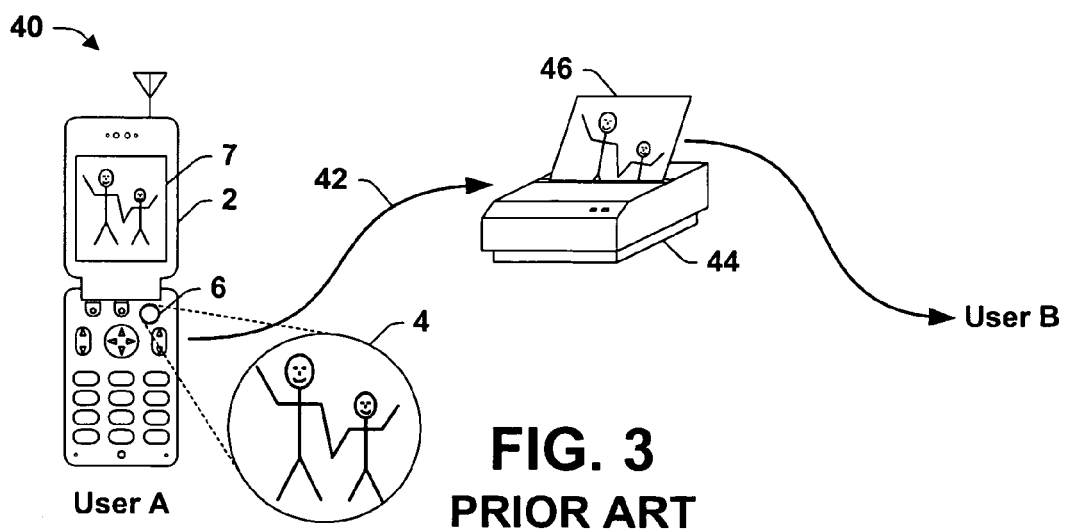

FIGS. 1, 2, and 3 illustrate prior art diagrams of the limited display and exchange of image content between cellular phone (or cell phone) users at present. In each of the figures, user A captures an image with his digital still camera (DSC) equipped cellular phone (or cell phone) and exchanges the image with another user B.

In prior art diagram 1 of FIG. 1, for example, user A has a cell phone 2 and captures an image 4 with a digital still camera (DSC) 6 built into his cell phone 2. Image 4 is typically stored in a local memory in the cell phone of user A and displayed on a small local LCD display 7 with low resolution. If user A wishes to share image 4 with user B, user A may send the image as message data via the cellular network 8, which retransmits the data to a cell phone 10 possessed by user B. Image 4 may then be displayed on a local LCD display 11 of the cell phone 10 of user B. In this method of image exchange, since the image is sent as a message using the cellular network 8, a call charge will likely be assigned one or both users, while the image is limited in resolution to the small local LCD display 11 of user B.

Similarly, in prior art diagram 20 of FIG. 2, user A wishes to share image 4 with user B. After capture of image 4, user A decides to store image 4 on a local removable memory card (e.g., a flash memory card) 22, and simply loan the memory card to user B for presentation on the small local LCD display 11 of cell phone 10 of user B. This method of image exchange may be acceptable, if user B is nearby, if the memory card is compatible with the cell phone 10 of user B, and if user B is likely to return the loaned memory card. Here again, the image is limited in resolution to the small local LCD display 11 of user B.

Finally, in prior art diagram 40 of FIG. 3, user A again wishes to share image 4 with user B, but wishes to try another method, for example, since he has not gotten his memory card back from user B yet, and has no more minutes left on his calling plan and limited budget. After capture of image 4, user A decides to transfer 42 image 4 from his cell phone 2 to a printer 44 producing a paper image 46 of image 4, which is then given to user B. This method of image exchange is more laborious, but may be acceptable, if the considerable time for the transfer 42 and printing process is not a problem, if the transfer process 42 is compatible between cell phone 2 and printer 44, and if user A can afford the paper and ink costs together with the time required each time a print-out is desired. In this type of image exchange, the image is limited to the resolution of the DSC 6 built into cell phone 2, to the imaging capability of the printer, and to the quality of the paper and ink chosen.

In order to better appreciate one or more features of the present invention, several exemplary implementations of the image display system, the modes of image exchange possible, the communications piconet, the subsystems of the child and host devices, and several image exchange methods are hereinafter illustrated and described with respect to the following figures.

Figure 4:
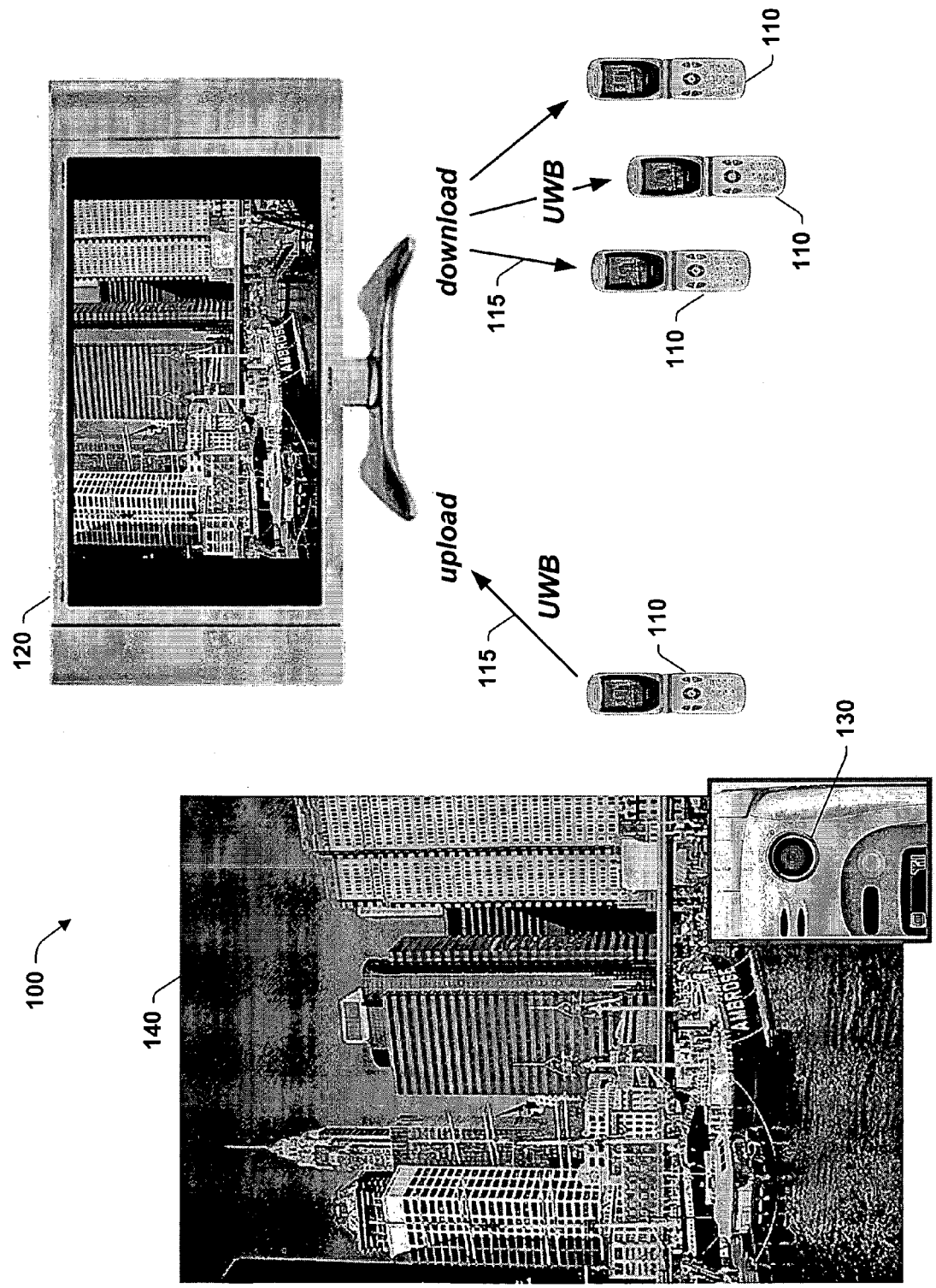
FIG. 4 is a simplified diagram of an exemplary picture or video image exchange between one or more cellular phones and a host display used in association with the display system of the present invention.
Figure 5:
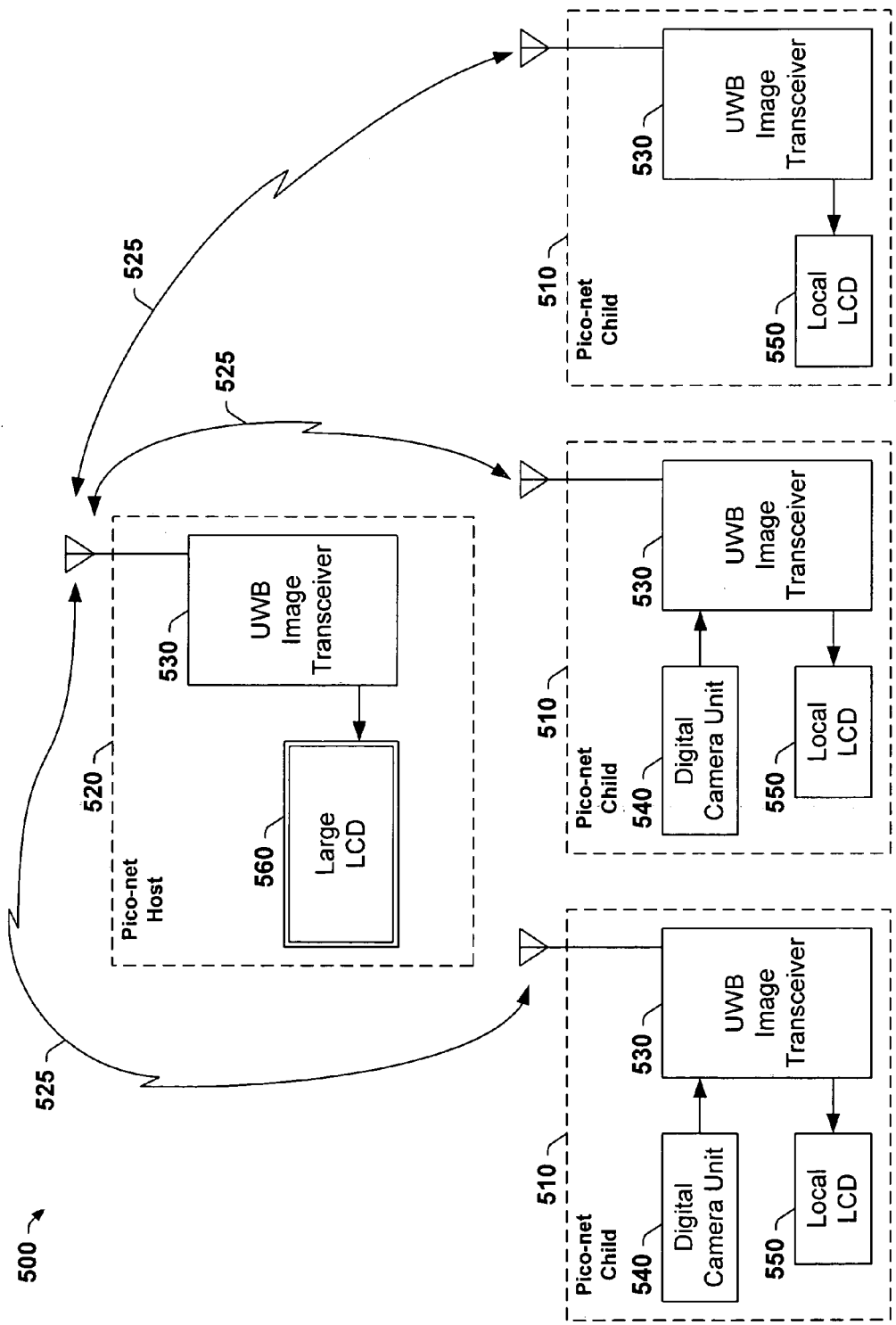
FIG. 5 is a diagram illustrating an exemplary image display system and piconet comprising one or more piconet child remote devices and a piconet host display, and communicating according to the IEEE 802.15.3a (UWB) standard used in association with the present invention.
Figure 6:
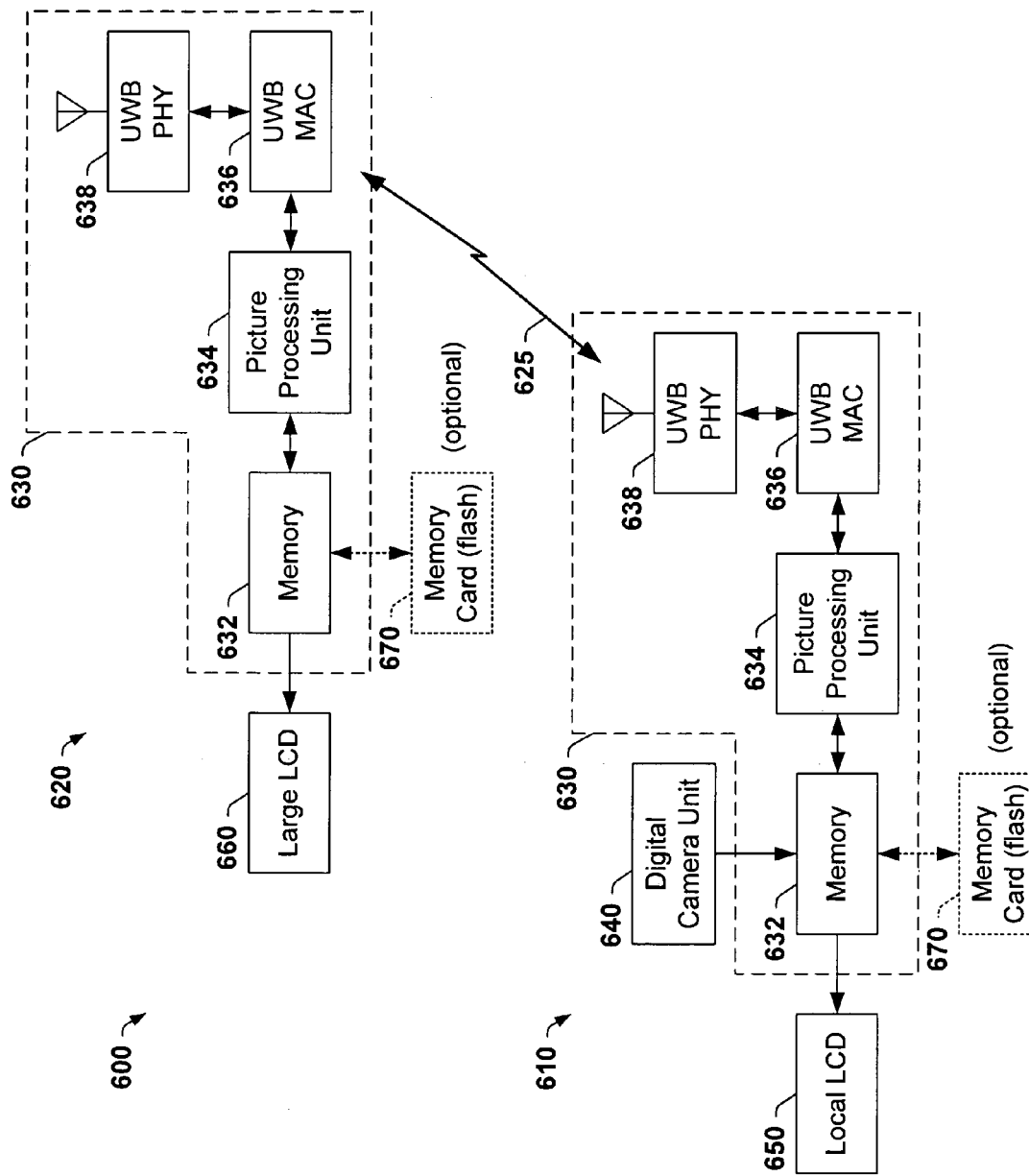
FIG. 6 is a simplified block diagram of the functional blocks of an exemplary image display system using UWB technology in accordance with various aspects of the present invention.
Figure 7:
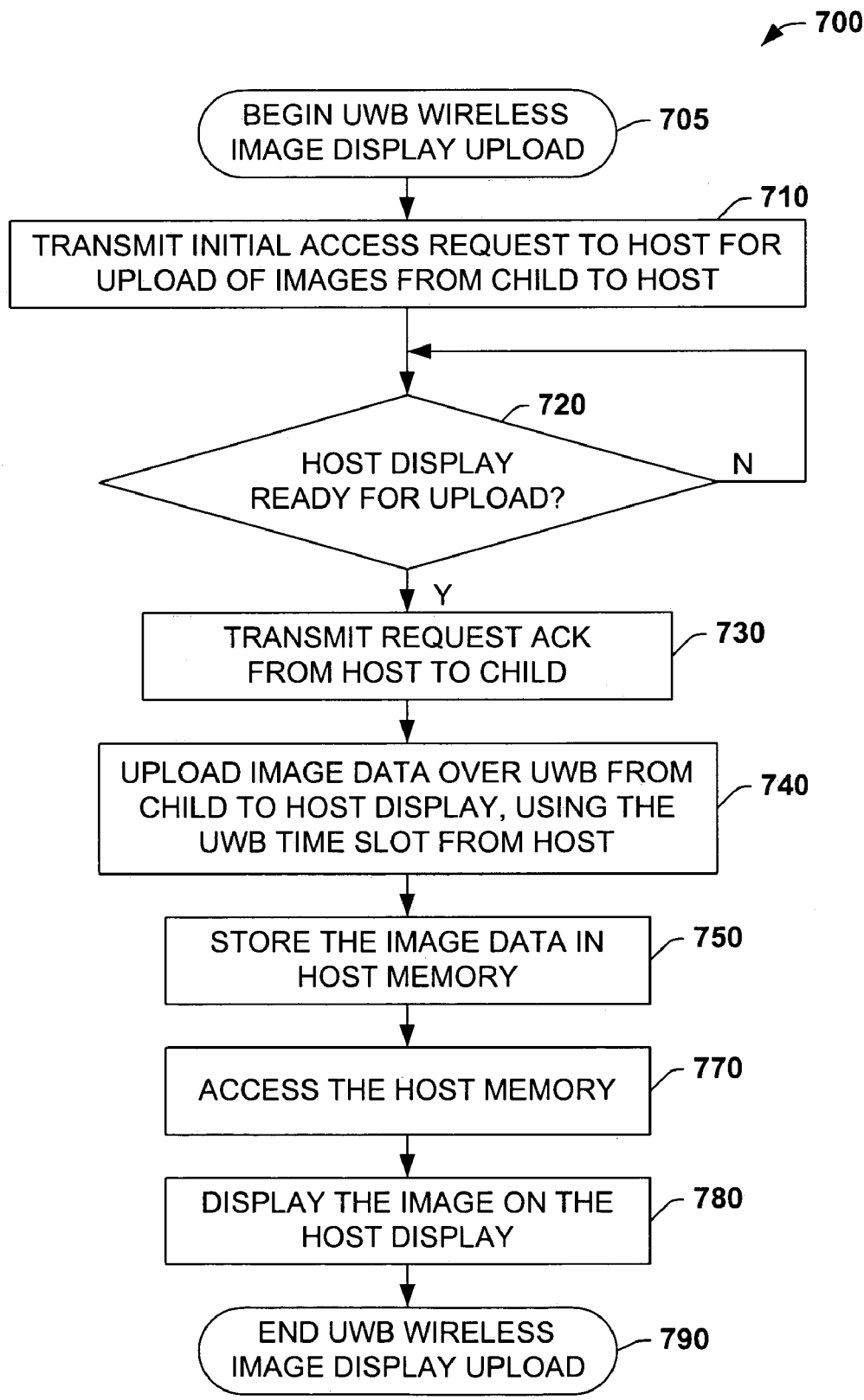
FIGS. 7-9 are flow charts illustrating various method aspects of uploading and downloading image data between a remote child and a host display in accordance with the display systems of FIGS. 4-6, and various aspects of the present invention.
Figure 8:
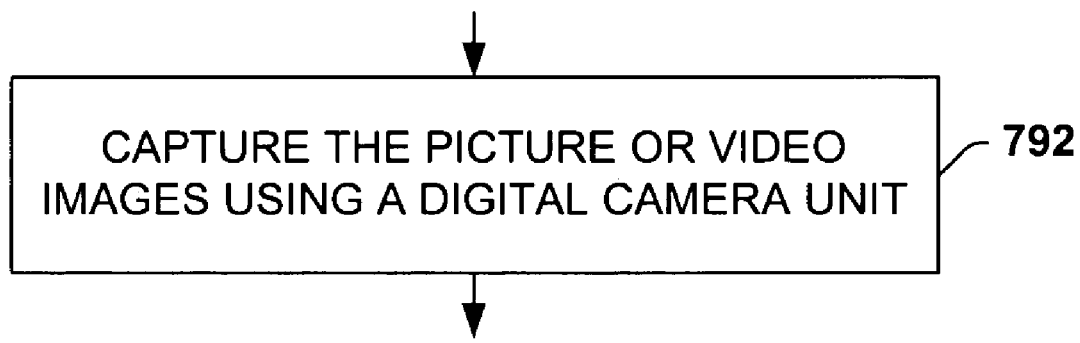
Figure 9:
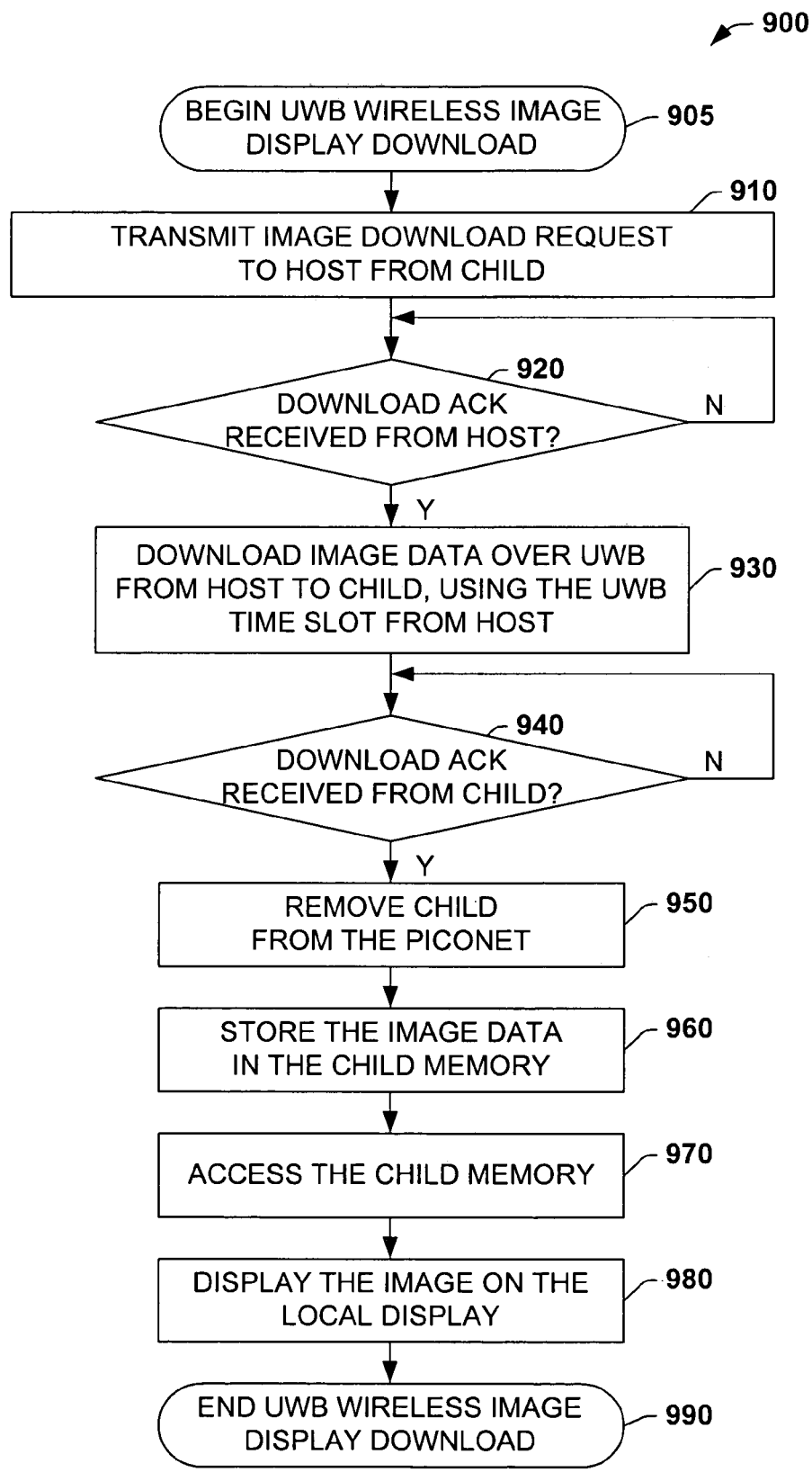

The inventive aspects of the image display system and associated FIGS. 4-6 will be initially presented, followed by those of the image exchange methods of the present invention and FIGS. 7-9.

In the proposed display system, UWB chipsets are used in, for example, both cellular phones (or a digital camera) and the host display device (e.g., a large LCD television, PC, or video projector). The picture on the cell phone is uploaded to the display device by a simple upload command over a UWB piconet, which would be defined as an initial access request to the display on the piconet. The initial access to the UWB host and its readiness and acceptance of the picture upload, is transmitted from the host display (piconet controller) to the cell phone (piconet child). The cellular phone then uploads the picture using the UWB time-slot assigned by the host display. The display, in one exemplary implementation, may overwrite the currently displayed picture or video image with the new uploaded image. The contributors to the present invention note here, that no additional frame memory is needed to realize this mechanism, because most new displays have internal image memory and the same memory may be re-used.

FIG. 4 illustrates a simplified diagram of an exemplary image display system 100 utilizing the UWB protocol used in association with the present invention for picture or video image display and exchange between one or more cellular phones and a host display. The exemplary display system 100, comprises one or more cell phones 110, that may selectively either upload image data 115 (e.g., picture or video image data) transmitted to a host display 120 (e.g., large LCD display, PC, plasma television), or receive image data 115 in a download transmission from the host display 120. At least one of the cell phones 110 further comprises a digital camera unit 130 to capture a picture or video image 140 for uploading image data 115 to the host display 120 for presentation. Thus, a larger image may be instantly displayed on a television (host display), transmitted directly from a cell phone having DSC capability over a UWB signal. In this way those present may more easily share in the experience of seeing the picture or video images on the larger display. A large plasma or flat panel display, CRT, or a video projector may provide a larger venue display experience.

When the users of cell phones 110 want to get a copy of the picture currently on the host display 120, they send a request command to the host display from their cell phones 110. The host 120, as the piconet controller, recognizes this command and responds to each cell phone 110 with the respective acknowledgment. The picture 140 download is performed independently to each cell phone 110. At 10 meters UWB can support as much as 110 Mbps throughput, and thus provides sufficient bandwidth for dozens of simultaneous accesses. This would create great amusement and fun at parties, weddings, homes or conferences.

To implement these wireless image exchange functions, both the host display 120 and the cell phones 110 further comprise a UWB image transceiver enabled chipset as will be illustrated in association with FIG. 5.

FIG. 5, for example, illustrates an exemplary image display system 500 and piconet used in accordance with the present invention. The piconet of the exemplary image display system 500 comprises one or more piconet child devices (remote devices) 510 and a piconet host (host display) 520, communicating 525 according to the IEEE 802.15.3a (UWB) standard used in association with the present invention. Each piconet child 510 or host device 520 comprises a UWB image transceiver 530 to store, control, transmit and receive image data in support of the UWB protocol over the piconet for communication and image exchange with another such device (510, 520) on the piconet.

In addition, at least one of the child devices 510 comprises a digital camera unit 540 for capturing picture or video images (e.g., 140 of FIG. 4) and a local display 550 for reviewing or editing the image content. Once captured, the image data may be stored in a memory associated with the UWB image transceiver 530, for later review, or for upload to the host 520. In addition to the UWB image transceiver 530, the host 520 comprises a large display 560 for improved or enhanced image presentation, particularly applicable in group settings. Note: the significance of the large display 560, is that a substantially larger, and/or substantially greater resolution display is more practical for fixed, non-portable display applications, where the greater power consumption, weight and size considerations are less problematic than, for example, in portable cell phones and digital camera applications.

The piconet child devices 510 are each selectively operable to upload or download the picture or-video image data directly to or from the host 520, respectively, over the UWB piconet. The piconet child device 510 may, for example, be implemented as a cellular phone with or without digital camera capability, as a digital camera, or as another similar consumer product equipped with the UWB image transceiver 530.

FIG. 6 illustrates the functional blocks of an exemplary image display system 600 using UWB wireless technology in accordance with various aspects of the present invention. (Note that FIG. 6 only illustrates the parts related with the new display features of an exemplary cellular phone and an LCD display of a television.) The image display system 600 comprises one or more piconet child devices 610, and a host display 620 communicating 625 in accordance with the UWB protocol on a piconet. Similar to display system 500 of FIG. 5, the child devices 610 and host display 620 of display system 600 of FIG. 6, each comprise a UWB image transceiver section 630 used to store, control, transmit and receive image data in support of the UWB protocol for image exchange with another such device (610, 620) on the piconet. The wireless child device 610 may be a cellular phone and/or a digital camera, while the host device 620 may be a host display device such as a television equipped with the UWB image transceiver 630.

UWB image transceiver section 630 comprises a memory 632, a picture or video processing unit 634, a UWB MAC unit 636, and a UWB PHY unit 638. The memory 632 temporarily stores image data of an image (e.g., 140 of FIG. 4) captured by a digital camera unit 640, for presentation on a local display 650 6r a host display 660. The picture processing unit 634 compresses the image data stored in the memory 632, and supports a graphics user interface (GUI) of the local display 650 and host display 660. The UWB MAC unit 636 supports the UWB protocol for sensing the UWB host 620, synchronizing communications 625 with the host 620, and establishing a communications link for uploading or downloading 625 image data to/from the host, respectively. The UWB PHY unit 638 comprises baseband and RF hardware coupled to the antenna. The UWB PHY unit 638 is used to transmit and receive 625 UWB signals of the image data over the UWB video piconet of the image display system 600.

Optionally, a local removable memory card (e.g., a flash memory card) 670 may be added to either the remote child device 610 or the host display 620 to provide a portable memory or increased memory for achieving images. The removable memory card 670 may also be combined with existing, or replaced by an existing memory used in the consumer electronics product (e.g., cell phone, television, digital camera).

Operationally, inside the exemplary cellular phone (with digital cameral capability), the picture is taken by the built-in camera and temporarily stored in the local memory. The image data is then compressed with the internal picture processing unit and the resultant data is stored in the memory card (usually a flash memory). The stored picture is locally viewed on the small local LCD display. Connected to the picture processing unit, the UWB MAC and UWB PHY units each correspond to the MAC layer protocol handling the UWB communication and the actual wireless modem. As illustrated, a picture upload to the host display may be initiated by enhancing the capability of the picture processing unit to enable communication with the UWB MAC. When one desires to upload the picture shown on the local LCD, the request command is sent to the UWB MAC to transmit the accessing signal to the host display (piconet host), and wait for an acknowledgment. When the acknowledgment comes back, this means that the host display is ready to receive the picture upload at a time assigned by the host. Then, using the UWB time-slot assigned by the host display, the picture processing unit reads out the image data from the memory and transmits it through the UWB MAC and the UWB PHY.

The internal structure of the host display is similar to the cellular phone except that it does not require the digital camera. When the host display receives the request by the child to join in the piconet of the host, the host checks the availability of the UWB time-slot and sends the acknowledgement to the cellular phone. In the most basic implementation, the host display instantly overwrites the current picture displayed with the new image arrival. Alternatively, the new data can be written to another location in memory.

When other people desire to get a copy of the picture currently on display at the host, they send a request to the host display in a similar manner to the upload request. The host display is able to accommodate dozens of simultaneous requests, because the UWB bandwidth is large. When the host display receives and identifies the downloading request, the host sends a corresponding acknowledgment to the cell phone. If the picture data is transmitted at 1 Mbps, over 100 accesses are supported in real-time within 10 meters distance from the host display. Because the uploaded pictures are stored in the local memory card of the host display, the selection of the downloaded picture or video images can be made on the host display by showing all the pictures in small icons or "thumbnail images" (similar to the way digital still camera pictures may be sorted on the PC monitor for archival purposes). When the host display receives the acknowledgement of the download from the cell phone, the host removes the cell phone from the piconet.

Thus, the contributors to the invention herein have realized that the UWB protocol may be utilized in association with the present invention of the improved display system. The image display system further reduces transmission power consumption with the spectrally efficient UWB transmission protocol for short distance communications without the added costs associated with the use of the existing cellular network, and limitations of some other methods of sharing images. Therefore, a large venue display of a cell phone image may be obtained in accordance with the present invention for enjoyment by groups and private viewing and for simple sharing with other cell phone users.

FIGS. 7-9 are flow charts illustrating various method aspects of wirelessly UWB uploading and downloading image data between a remote child and a host display in accordance with the display systems of FIGS. 4-6, and various aspects of the present invention.

FIG. 7, for example, illustrates an exemplary method 700 of uploading picture or video image data as a message communicated (e.g., 525, 625) from a child 110, 510, 610 (e.g., cellular phone, or digital camera) to a host 120, 520, 620 (e.g., host display, television) over the UWB video piconet. The upload method 700 comprises initially issuing an access request to the host to upload the image data from the child according to the UWB protocol. When an acknowledgement is received back from the host, the child transmits the image data at a time prescribed by the host. When the data is received in the host and stored in a local memory, the host displays the data from the memory on the large host display screen.

While the method 700 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 700 according to the present invention may be implemented in association with the network elements, devices, protocols and formats illustrated and described herein as well as in association with other elements, devices, protocols and formats not illustrated.

The exemplary image display method 700 of FIG. 7, in accordance with the wireless UWB piconet and display systems of FIGS. 4-6, begins at 705. Initially at 710 the child 110, 510, 610 (e.g., cell phone, digital camera) transmits an access request to the host 120, 520, 620 (e.g., host display, television, PC, projector) requesting an upload of image data 115 in accordance with the UWB protocol. When the host is ready for the upload at 720, the host transmits a request acknowledgment back to the child at 730 along with an assigned transmission time. At the assigned transmission time-slot, at 740, the child uploads (transmits) the image data to the host display over the UWB wireless piconet. At 750 the image data is stored in the host memory. The host memory may be accessed at 770 for display of the image on the host display at 780.

Thereafter, the display system upload method ends at 790, wherein one or more cell phones may upload picture or video images to a host display of a UWB wireless network.

Optionally, method 700 further comprises capturing the picture or video images using a digital camera unit at 792 of FIG. 8 before proceeding to upload the image data at 710 of FIG. 7. Otherwise, upload method 700 of FIG. 7 assumes image data already exists in the local memory from a previous source, for example, image data may have been supplied by a flash memory card, a download from the cellular network, from the internet, or from a prior UWB download from the host.

Referring now to FIG. 9, an exemplary method 900 is illustrated for downloading image data as a message communicated (e.g., 525, 625) from a host 120, 520, 620 (e.g., host display, television) to a child 110, 510, 610 (e.g., cellular phone) over the UWB video piconet. The download method 900 comprises initially transmitting a download request to the host for downloading the currently displayed picture or video image from the host according to the UWB protocol. When an acknowledgement is received from the host, the host transmits the image data at a time prescribed by the host. When the image data is received in the child, an acknowledgement is issued to the host and the host removes the child (cell phone) from the piconet. The image data is stored in a local memory of the child and the child displays the data from the memory on the small local display of the child.

The exemplary image display method 900 of FIG. 9, in accordance with the wireless UWB piconet and display systems of FIGS. 4-6, begins at 905. Initially at 910 the child 110, 510, 610 (e.g., cell phone, digital camera) transmits an image download request to the host 120, 520, 620 (e.g., host display, television, PC, projector) requesting an download of image data 115 in accordance with the UWB protocol. When the host is ready a request acknowledgment is transmitted back to the child at 920 along with an assigned transmission time. At the assigned transmission time-slot, the host then downloads (transmits) at 930 the requested image data to the child (e.g., requesting cell phone, or multiple cell phones) over the UWB wireless piconet.

At 940 when the image data has been downloaded, and an acknowledgement has been received at the host from the child, the cell phone is removed at 950 from the piconet. At 960 the image data is stored in the child memory. The host memory may be accessed at 970 for display of the image on the child display at 980.

Thereafter, the display system download method ends at 990, wherein one or more cell phones may simultaneously download picture or video images from a host display of a UWB wireless network.

Thus, the methods employing the UWB protocol provide a wireless network low power display system that permits a cellular phone or digital camera to upload and display picture or video images on a large display device such as a television or video projector, avoiding costs associated with a cellular network for presentation in group or private viewing settings. In addition the exemplary display system method of the UWB wireless protocol, facilitates multiple simultaneous sharing downloads from a single host display.

The current draft of 802.11e, however, does not require data frames to match the TID in the QoS Poll frame. If any future revision requires otherwise, the firmware may maintain a separate queue for each Tspec on the station side.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A display system for transmitting and receiving picture or video images between one or more wireless remote devices and a host display communicating on an Ultra-WideBand (UWB) wireless network using a UWB protocol, the display system comprising:
   the host display unit comprising:
      a display for presentation of the picture or video images;
      a host UWB image transceiver operating as a UWB host for wirelessly receiving the picture or video images for presentation on the display, and for selectively transmitting picture or video images based on receipt of an image selection request from one of the wireless remote devices the host UWB image transceiver further comprises:
         a memory for temporarily storing the picture and video images as image data captured by the digital camera unit and for presentation by the host display and the local display;
         a picture processing unit for compressing the image data stored in the memory, and for support of the graphics user interface of the host and local display;
   the one or more wireless remote devices comprising:
      a digital camera unit for capturing a picture or video image;
      a local display for presentation of a picture or video image;
      a UWB child image transceiver, comprising:
         a UWB MAC unit for support of the UWB protocol used to sense the UWB host and synchronize communications with the UWB host, to set up a communication link between the UWB host and one of the remote devices for uploading and downloading the picture and video image data to and from the UWB host, respectively;
         a UWB PHY unit having baseband and RF hardware coupled to an antenna and used to send and receive UWB signals;
      wherein the one or more wireless remote devices operable to wirelessly transmit captured picture or video images to the host display unit and to selectively receive picture or video images from the host display unit based on generating and transmitting the image selection request to the host display unit;
      wherein one or more of the wireless remote devices capture and transmit a picture or video image to the host display unit, and wherein upon receipt of an image selection request, the host display unit transmits the displayed image to the UWB wireless network, the image subsequently received by the requesting wireless remote device on the UWB wireless network;
   wherein in the remote device, the digital camera unit, the local display, and the picture processing unit are operably coupled to the memory, the picture processing unit is operably coupled to the UWB MAC unit, the UWB MAC unit is coupled to the UWB PHY unit, which is also connected to the antenna,
   wherein in the host display unit, the large display, and the picture processing unit is operably coupled to the memory, the picture processing unit is operably coupled to the UWB MAC unit, the UWB MAC unit is coupled to the UWB PHY unit, which is also connected to the antenna, wherein in one of the remote devices, image data from the digital camera unit is stored in the memory for image presentation on the local display and is selectively transmitted to the host display unit by passing image data from the memory to the picture processing unit for image data decompression, which is sent to the UWB MAC unit for synchronization in accordance with the UWB protocol and to the UWB PHY unit for UWB baseband addition and RF modulation of the UWB signal and to the antenna for transmission to the host display unit; and
   wherein in the host display unit, image data from the digital camera unit is received in the UWB image transceiver over the RF modulated baseband of the UWB signal via the antenna of the UWB PHY unit into the UWB MAC unit for synchronization in accordance with the UWB protocol for communication to the picture processing unit for image data compression and storage in the memory for image presentation on the large display of the host display unit, the UWB image transceiver of the host display unit operable to selectively retransmit the captured picture or video images to the remote devices based on generating and transmitting an image selection request to the host display unit.

2. The display system of claim 1, wherein the digital camera unit of one or more of the wireless remote devices is operable to capture live video images.

3. The display system of claim 2, wherein the host display unit and least one of the wireless remote devices are operable to communicate and display the live video images.

4. The display system of claim 1, wherein the host display unit and the one or more wireless remote devices are operable to communicate using a UWB signal directly between one another exclusive of a wide area network.

5. The display system of claim 4, wherein the host display unit is operable to directly upload and display the picture or video images from one of the wireless remote devices.

6. The display system of claim 1, wherein the one or more remote wireless devices are one or more wireless telephones.

7. The display system of claim 6, wherein the host display unit is operable to directly upload and display the picture or video images from one of the wireless telephones.

8. The display system of claim 6, wherein one or more of the wireless telephones is operable to receive the picture or video images using a UWB signal directly from another of the wireless telephones.

9. The display system of claim 8, wherein one of the wireless telephones is operable to directly download and display the picture or video images using the UWB signal directly from the host display unit or from one of the wireless telephones.

10. The display system of claim 6, wherein one or more of the wireless telephones have a digital camera unit, the wireless telephone operable to transmit the picture or video images.

11. The display system of claim 10, wherein one of the wireless telephones is operable to receive and display the picture or video images captured by the digital camera unit downloaded directly from the host display unit using a UWB signal.

12. The display system of claim 1, wherein the host display unit comprises one of a television, computer, or video projector for display of one or more picture or video images uploaded from one of the wireless remote devices.

13. The display system of claim 12, wherein the host display unit comprises one of an Liquid Crystal Display (LCD), Cathode Ray Tube (CRT), Plasma, flat panel, and Digital Light Processing (DLP™) display technology.

14. A wireless telephone for communicating picture or video images over an Ultra-WideBand (UWB) wireless signal, the wireless telephone comprising:
   a digital camera unit for capturing the picture or video images;
   a local display for local presentation of the captured picture or video images; and
   a UWB image transceiver selectively operable to transmit or receive the captured picture or video images over a UWB wireless signal directly communicating with a host display unit, the receiving of the picture or video images based on receipt by the host display unit of an image selection request from the wireless telephone, said UWB image transceiver comprising:
      a UWB MAC unit for support of the UWB protocol operable to set up a communication link between the wireless telephone and the host display unit or the second wireless telephone for uploading and download mg the picture and video image data, and
      a UWB PHY unit having baseband and RF hardware coupled to an antenna and used to send and receive UWB signals;
      a memory for temporarily storing the picture and video images as image data captured by the digital camera unit and for presentation by the host display and the local display;
      a picture processing unit for compressing the image data stored in the memory, and for support of the graphics user interface of the host and local display;
   wherein the UWB MAC unit is used to sense a UWB host and synchronize communications with the UWB host, wherein in the wireless telephone, the digital camera unit, the local display, and the picture processing unit are operably coupled to the memory, the picture processing unit is operably coupled to the UWB MAC unit, the UWB MAC unit is coupled to the UWB PHY unit, which is also connected to the antenna, and further wherein in the wireless telephone, image data from the digital camera unit is stored in the memory for image presentation on the local display and is selectively transmitted to the host display by passing image data from the memory to the picture processing unit for image data decompression, which is sent to the UWB MAC unit for synchronization in accordance with the UWB protocol and to the UWB PHY unit for UWB baseband addition and RF modulation of the UWB signal and to the antenna for transmission to the host display, and wherein the wireless telephone captures the picture or video images for display on the local display and selectively transmits the picture or video images to the host display unit, and wherein upon subsequent receipt of an image selection request from the wireless telephone or another wireless telephone, the host display unit retransmits the displayed image to the requesting wireless telephone over a UWB wireless signal.

15. The wireless telephone of claim 14, wherein the host display unit has a substantially larger display than the local display.

16. The wireless telephone of claim 14, wherein the wireless telephone is a cellular telephone and the host display unit is a television.

17. A wireless digital camera for transmitting or receiving a picture or video images over an Ultra-WideBand (UWB) wireless signal in direct communication with a host display unit having a UWB image transceiver operating as a UWB host, the wireless digital camera comprising:
   a digital camera unit for capturing the picture or video images;
   a local display for presentation of the picture or video images; and
   a UWB image transceiver selectively operable to communicate directly with the host display over a UWB wireless signal based on receipt of an image selection request from the receiving wireless digital camera to transmit or receive the captured picture or video images, the UWB image transceiver comprising:
      a UWB MAC unit for support of the UWB protocol used to sense the UWB host and synchronize communications with the host, to set up a communication link between the host and digital camera for uploading and download mg the picture and video image data to and from the host, repectively; and
      a UWB PHY unit having baseband and RF hardware coupled to an antenna and used to send and receive UWB signals;
      a memory for temporarily storing the picture and video images as image data captured by the digital camera unit and for presentation by the local display;
      a picture processing unit for compressing the image data stored in the memory, and for support of the graphics user interface of the local display;
   wherein the digital camera unit, the local display, and the picture processing unit are operably coupled to the memory, the picture processing unit is operably coupled to the UWB MAC unit, the UWB MAC unit is operably coupled to the UWB PHY unit, which is also operably coupled to the antenna,
   wherein image data from the digital camera unit is stored in the memory for image presentation on the local display and is selectively transmitted to the host display by passing image data from the memory to the picture processing unit for image data decompression, which is sent to the UWB MAC unit for synchronization in accordance with the UWB protocol and to the UWB PHY unit for UWB baseband addition and RF modulation of the UWB signal and to the antenna for transmission to the host display, and
   wherein the wireless digital camera captures and transmits the picture or video images to the host display, and wherein upon receipt of an image selection request, the host display retransmits the displayed image to the wireless digital camera over a UWB wireless signal.

18. A wireless display device for displaying picture or video images on a host display unit having a UWB image transceiver operating as a UWB host, the image data received over an Ultra-WideBand (UWB) wireless signal directly from a UWB remote device, the wireless display device comprising:
   the host display unit for presentation of the picture or video images; and
   a UWB image transceiver selectively operable to receive or transmit the picture or video images over a UWB wireless signal directly communicating with the UWB remote device based on receipt of an image selection request from the UWB remote-device, said UWB image transceiver comprising:
      a UWB MAC unit for support of the UWB protocol used to sense the UWB host and synchronize communications with the UWB host, to set up a communication link between the UWB host and one of the remote UWB devices for uploading and downloading the picture and video image data to and from the host display unit, respectively; and a UWB PHY unit having baseband and RF hardware coupled to an antenna and used to send and receive UWB signals;

a memory for temporarily storing the picture and video images as image data captured by a digital camera unit and for presentation by the host display unit;

a picture processing unit for compressing the image data stored in the memory, and for support of the graphics user interface of the host display unit;

wherein the host display unit and the picture processing unit are operably coupled to the memory, the picture processing unit is operably coupled to the UWB MAC unit, the UWB MAC unit is coupled to the UWB PHY unit, which is also operably coupled to the antenna, wherein in the host display unit, image data from the digital camera unit is received in the UWB image transceiver over the RF modulated baseband of the UWB signal via the antenna of the UWB PHY unit into the UWB MAC unit for synchronization in accordance with the UWB protocol for communication to the picture processing unit for image data compression and storage in the memory for image presentation on the large display of the host display, the UWB image transceiver of the host display unit operable to selectively retransmit the captured picture or video images to the UWB remote devices based on generating and transmitting an image selection request to the host display unit, and wherein the UWB remote device captures and transmits the picture or video images to the wireless display device, and wherein upon receipt of an image selection request, the wireless display device transmits the displayed picture or video images directly over a UWB wireless signal to the requesting UWB remote device.

19. The wireless display device of claim 18, wherein the wireless display device comprises one of a television, computer, or video projector for display of one or more picture or video images uploaded from the UWB remote device.

20. The wireless display device of claim 18, wherein the host display unit comprises one of an Liquid Crystal Display (LCD), Cathode Ray Tube (CRT), Plasma, flat panel, and Digital Light Processing (DLP™) display technology.

21. The wireless display device of claim 18, wherein the wireless display device has a substantially larger display than the display of the UWB remote device.

22. A method of communicating picture or video images over an Ultra-WideBand (UWB) wireless signal directly between a cellular telephone and a host display unit having a UWB image transceiver operating as a UWB host of a display system, the host display unit having a UWB host, the method comprising:

sensing the UWB host;

synchronizing communications with the UWB host and the cellular telephone;

transmitting an initial access request from the cellular telephone to the host display unit, requesting an upload of the picture or video images;

waiting for readiness of the host display unit;

transmitting from the host display unit to the cellular telephone, an acceptance for the upload;

uploading the picture or video images over the UWB wireless signal to the UWB host using a UWB time-slot assigned by the UWB host;

storing the picture or video images in a host memory of the host display unit;

accessing the host memory;

displaying the picture or video images on the host display unit;

sensing a requesting cellular telephone;

transmitting an image download request to the host display from the requesting cellular telephone;

requesting a download of the picture or video images currently displayed on the host display unit;

waiting for an acknowledgement from the host display unit for the download;

transmitting to the requesting cellular telephone, the acknowledgement for the download;

downloading the picture or video images over the UWB wireless signal to the requesting cellular telephone using a UWB time-slot assigned by the UWB host; and receiving and storing the picture or video images in a local memory of the requesting cellular telephone.

23. The method of claim 22, wherein the downloading of the picture or video images from the host display unit is simultaneously downloaded to one or more requesting cellular telephones.

24. The method of claim 22, wherein the receiving and storing of the picture or video images downloaded from the host display unit is simultaneously received and stored in the local memory of one or more requesting cellular telephones.

25. The method of claim 22, further comprising:

capturing the picture or video images using a digital camera unit prior to transmitting the initial access request from the cellular telephone to the host display unit.

* * * * *

UNITED STATES PATENT AND TRADEMARK OFFICE
CERTIFICATE OF CORRECTION

PATENT NO. : 7,327,385 B2 Page 1 of 1
APPLICATION NO. : 10/717776
DATED : February 5, 2008
INVENTOR(S) : Hirohisa Yamaguchi and Hiroyuki Satoh It is certified that error appears in the above-identified patent and that said Letters Patent is hereby corrected as shown below:

On the Title Page Item (75): Please add --Hiroyuki Satoh, Tsukuba, Ibaraki (JP)-- as a second inventor.

Signed and Sealed this

Eighth Day of July, 2008

JON W. DUDAS
*Director of the United States Patent and Trademark Office*